Patented Nov. 10, 1942

2,301,515

UNITED STATES PATENT OFFICE 2,301,515

METHOD OF MAKING ACETYL-CYCLO-ALKENES

Edgar C. Britton, Howard S. Nutting, and Lee H. Horsley, Midland, Mich., assignors to The Dow Chemical Company, Midland, Mich., a corporation of Michigan No Drawing. Application July 31 1940, Serial No. 348,818

15 Claims. (Cl. 260—586)

This invention concerns a method for making certain acetyl-cycloalkenes having the general formula,

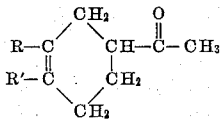

wherein R and R' each represents hydrogen or a lower alkyl radical, and it particularly concerns the preparation of 1,2,3,6-tetrahydro-acetophenone. The products are liquids of pleasant odor and are useful as ingredients of perfumes. They may also be employed as chemical agents from which a variety of other organic compounds may be prepared.

We have discovered that when a hydrocarbon mixture comprising a conjugated aliphatic diolefine and vinyl acetylene is treated at a reaction temperature with an aqueous solution or suspension of a mercuric or mercurous salt, e. g. mercuric sulphate, basic mercuric sulphate, mercurous sulphate, mercuric acetate, mercurous acetate, mercuric phosphate, etc., the vinyl acetylene undergoes both hydration and condensation with the diolefine to form a corresponding acetyl-cycloalkene having the general formula hereinbefore given. The reaction is simple to carry out and produces the acetyl-cycloalkene product in good yield. The reaction which takes place is illustrated by the following equation:

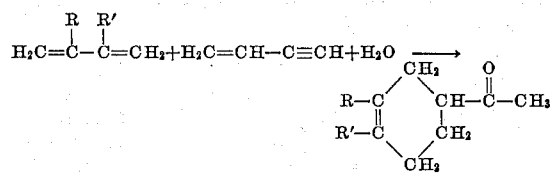

wherein R and R' each represents hydrogen or a lower alkyl radical, e. g. the methyl or ethyl radical.

We have further found that the reaction occurs most smoothly and satisfactorily when carried out in the presence of a mild oxidizing agent such as a water-soluble ferric or manganic salt, etc. When carrying the reaction out in apparatus constructed of usual structural metals, e. g. iron or steel, the presence of such oxidizing agent is particularly advantageous, since it reduces the tendency toward precipitation of mercury from the catalyst and resultant attack of the mercury, e. g. by amalgamation, on the apparatus.

Examples of conjugated diolefines which may be employed in the process are butadiene-1,3; isoprene; 2,3-dimethyl-butadiene-1,3; 2-ethyl-butadiene-1,3; 2,3-diethyl-butadiene-1,3; etc. Each such conjugated diolefine may be reacted with vinyl acetylene to form a corresponding acetyl-cycloalkene as indicated in the above equation.

The conjugated diolefine and the vinyl acetylene employed in the process may be derived from any source. They may be employed as the pure compounds or may be used in admixture with other hydrocarbons. Cracked-oil gas, obtained by the pyrolysis of petroleum fractions, coal tar distillate, etc., often contains, in admixture with other hydrocarbons, one or more diolefines and a minor proportion of vinyl acetylene; e. g. such gas usually comprises a complex mixture of hydrocarbons including paraffinic hydrocarbons such as methane, ethane, propane, butane, etc.; olefinic hydrocarbons such as ethylene, propylene, butylene, amylene, etc.; diolefinic hydrocarbons such as butadiene, isoprene, etc.; and acetylenic hydrocarbons such as acetylene, methyl acetylene, ethyl acetylene, vinyl acetylene, etc. It is a convenient and inexpensive source of the diolefines and vinyl acetylene employed in practice of the invention.

The cracked-oil gas, or any fraction thereof containing a conjugated diolefine and vinyl acetylene, may be employed directly in the process, in which case the vinyl acetylene reacts with water and a portion of the diolefine present to form the desired acetyl-cycloalkene. Other acetylenes, e. g. acetylene, methyl acetylene, ethyl acetylene, etc., which may be present become hydrated to form corresponding aldehydes or ketones. The excess of diolefine over that consumed in forming the acetyl-cycloalkene, and also any olefines or paraffins present, remain substantially unreacted. After completion of the reaction, the mixture may be distilled or otherwise treated to recover the acetyl-cycloalkene product and also to recover the unreacted diolefine in a form substantially free of acetylenic hydrocarbons. Accordingly, the invention is applicable as a method not only for the preparation of the acetyl-cycloalkenes, but also for the removal of acetylenic hydrocarbons from diolefines containing minor proportions of the same.

An aqueous solution or mixture of mercuric sulphate or basic mercuric sulphate is preferably employed in the reaction, although other mercury salts such as those hereinbefore mentioned may be used. The aqueous mixture preferably contains from 1 to 5 per cent by weight of mercuric sulphate, based on the water present, or an equivalent proportion of other mercury salts, since use of the salt in lower concentration may not permit sufficiently rapid reaction and use of the salt in higher concentration may result in incomplete utilization of the same. However, the salt can be used in lower or higher concentrations, if desired. The aqueous mixture is preferably acidic, since the presence of an acid corresponding to the mercury salt sometimes increases the solubility of the latter and thereby increases its catalytic activity. However, the presence of an acid is not required. A solution or suspension of mercuric sulphate in an aqueous sulphuric acid solution of from less than 1 to about 60 per cent by weight concentration may be used in the reaction. Care should be taken not to employ the acid in a concentration and at a temperature sufficient to cause substantial polymerization of the diolefine, e. g. when the reaction is carried out at 25° C. or lower the aqueous sulphuric acid solution may be of any concentration up to 60 per cent, but when operating at higher temperatures it should be of concentration below 60 per cent.

As hereinbefore mentioned, the aqueous mixture of a mercuric salt may advantageously also contain a water-soluble, mild oxidizing agent, e. g. ferric sulphate, ferric nitrate, manganic sulphate, etc. Ferric sulphate is preferably employed in a concentration between 1 and 15 per cent by weight, based on the water present, but it may be of lower concentration or be omitted. Care should be observed not to employ the ferric salt in a concentration and at a temperature sufficient to cause polymerization of the diolefine, e. g. when operating at 25° C. or lower the ferric sulphate may be of as high as 15 per cent concentration, based on the water present, but when operating at higher temperatures it is preferably used in correspondingly lower concentration.

In carrying out the reaction, a conjugated diolefine, e. g. butadiene, isoprene, etc., and vinyl acetylene in any desired proportions, or preferably a hydrocarbon mixture such as cracked-oil gas or a fraction thereof containing one or more diolefines and vinyl acetylene, is charged into admixture with the above-described aqueous mixture or solution of a mercuric salt, which aqueous mixture or solution also preferably contains a water-soluble ferric salt in the concentration given above.

The reaction may be effected by passing the gaseous hydrocarbon mixture through a scrubbing tower, wherein it is scrubbed with the aqueous salt mixture, or by agitating an aqueous mixture of the hydrocarbons and the catalytic salts in a closed reactor, e. g. a bomb or autoclave. The reaction may be carried out at atmospheric pressure or above and at any temperature between room temperature and the temperature at which the diolefine undergoes decomposition and/or polymerization. It occurs most smoothly and satisfactorily when carried out in liquid phase at super-atmospheric pressure, e. g. in a bomb or autoclave at a pressure equal to or exceeding the vapor pressure of the mixture, and at temperatures below 100° C. and preferably between 40° and 80° C. The time required for completion of the reaction under the preferred conditions just given is usually between 0.5 and 10 hours.

When the reaction has been carried out by scrubbing of the hydrocarbon gases with an aqueous mixture of the catalytic salts the acetyl-cyclohexene product and any other ketones or aldehydes produced by the reaction are usually retained largely in solution or mixture with the aqueous scrubbing-liquor. They may be recovered by conventional procedure, e. g. steam distillation, extraction with a water-miscible solvent such as ether, benzene, cyclohexane, etc., or by mechanical separation when the proportion thereof is sufficient to cause the formation of a distinct oil layer. They are then fractionally distilled to separate the acetylcyclohexene product. The hydrocarbon gas is rendered relatively free of acetylene hydrocarbons, but it may carry with it vapors of the aldehydes or ketones formed by hydration of the acetylenes. Such aldehyde or ketone may be removed either by distillation or by scrubbing the gas with an aqueous solution of an alkali metal acid-sulphite, e. g. sodium or potassium acid-sulphite, to recover the diolefine-containing gas in a form substantially free of acetylenes and their reaction products.

When the treatment of cracked-oil gas with the aqueous catalytic salt solution has been carried out under pressure in liquid phase, the reacted mixture is permitted to settle and the organic and aqeuous layers thereof are separated. The aqueous layer may be partially distilled and the organic layer of the distillate combined with the organic layer which was mechanically separated from the reacted mixture. The organic mixture thus obtained may be evaporated or distilled to obtain the acetyl-cyclohexene product. During such evaporation or distillation the first fractions obtained consist of unreacted hydrocarbons, including the excess of diolefine over that consumed in the reaction. The diolefine-containing material thus recovered is substantially free of acetylenes but may contain a small portion of the acetyl-cyclohexene product as well as other ketones or aldehydes formed in the reaction. It may advantageously be treated with an aqueous alkali metal acid-sulphite solution to remove the aldehydes and ketones as the addition compounds thereof with the sulphite, thus rendering the residual diolefine-containing gas free of such compounds. Ketones and aldehydes may be recovered from the sulphite addition product by heating the latter with water or an aqueous solution of an acid or an alkali. The mixture of ketones and/or aldehydes thus obtained may be distilled to recover the acetyl-cycloalkene contained therein, thus completing the recovery of this product.

The following examples describe certain ways in which the principle of the invention has been applied, but they are not to be construed as limiting the invention.

*Example 1*

To a mixture of 213 parts by weight of water, 2.6 parts of ferric sulphate and 1 part of mercuric oxide there was added 33.3 parts of 99 per cent concentrated sulphuric acid and the mixture was agitated until solution resulted. The resultant solution was placed in an autoclave and approximately 500 parts of partially purified butadiene which contained 3 per cent by weight of acetylene hydrocarbons (largely vinyl acetylene was added in liquefied form. The autoclave was closed and the mixture was agitated and heated at 50°–60° C. for approximately 5 hours. The mixture within the autoclave was permitted to settle and the aqueous and organic layers thereof were separated while under pressure. The organic layer was fractionally distilled under pressure. The major portion of the butadiene was recovered as the first fraction of distillate, in a form containing less than 0.05 per cent by weight of acetylenic hydrocarbons. As higher boiling fractions of the distillate there were obtained the aldehydes and ketones formed during the treatment. The fraction distilling at approximately 186°–187° C. at atmospheric pressure was found to be 1,2,3,6-tetrahydroacetophenone. This compound is a colorless liquid having a specific gravity of approximately 0.951 at 25°/25° C. and the index of refraction, $n^{20}/_D = 1.469$. It has the formula,

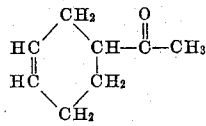

The semi-carbazone of 1,2,3,6-tetrahydro-acetophenone is a crystalline compound melting at approximately 165° C.

Example 2

The compound, 1,2,3,6-tetrahydro-acetophenone, was also prepared by heating a mixture of 11 cubic centimeters of liquefied vinyl acetylene, 11 cubic centimeters of butadiene and 10 cubic centimeters of an aqueous solution containing 15 per cent by weight of sulphuric acid and 1 per cent of mercuric sulphate in a bomb at 50° C. for 27 hours. After completing the reaction, the bomb was opened and unreacted hydrocarbons were permitted to evaporate from the mixture. The 1,2,3,6-tetrahydro-acetophenone product remained as a distinct organic layer above the aqueous catalyst solution and was separated mechanically from the aqueous layer.

Example 3

A bomb was charged with 100 grams of 15 per cent by weight concentrated aqueous sulphuric acid solution, 5 grams of mercuric oxide, 21 grams of vinyl acetylene and 29 grams of isoprene of 80 per cent purity, closed and heated with agitation at a temperature of 45° C. for 20 hours. The bomb was then opened and the charge removed. The reacted mixture separated on standing into an oil layer and an aqueous layer. The oil layer was separated from the aqueous layer and the latter was partially distilled to recover any dissolved organic product therefrom. The oil layer of the distillate was separated and combined with the oil which had been separated from the crude reacted mixture. The combined oils were dried and fractionally distilled. The fractions distilling at temperatures below 200° C. consisted principally of the unreacted hydrocarbons and vinyl ethyl ketone. The fraction distilling at temperatures between 200° and 210° C. was a colorless liquid having the index of refraction, $n^{25}_D = 1.47$. It was found to be methyl-1,2,3,6-tetrahydro-acetophenone having the formula,

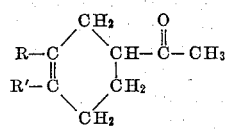

wherein one of the symbols R and R' represents the methyl radical and the other represents hydrogen. The methyl-1,2,3,6-tetrahydro-acetophenone reacts with 2.4-dinitrophenylhydrazine to form a crystalline orange colored derivative having the melting point 114°–115° C.

Other acetyl-cycloalkenes may be prepared by the method herein described. For instance, the invention may be applied in effecting reaction between water, vinyl-acetylene and:— 2-ethyl-butadiene-1,3 to form an ethyl-1,2,3,6-tetrahydro-acetophenone; with 2,3-dimethyl-butadiene-1,3 to form 4,5-dimethyl-1,2,3,6-tetrahydro-acetophenone; with 2,3-diethyl-butadiene-1,3 to form 4,5-diethyl-1,2,3,6-tetrahydro-acetophenone, etc.

In all such instances, any excess of the conjugated diolefine over that consumed in the reaction may be recovered in a form relatively free of acetylene hydrocarbons.

Other modes of applying the principle of the invention may be employed instead of those explained, change being made as regards the steps or compounds herein disclosed, provided the steps or compounds stated by any of the following claims or the equivalent of such stated steps or compounds be employed.

We therefore particularly point out and distinctly claim as our invention:

1. In a method of making a compound having the general formula:

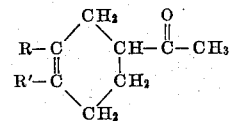

wherein R and R' each represents hydrogen or an alkyl radical, the step which consists in reacting vinyl acetylene with water and a conjugated aliphatic diolefine in the presence of a salt of mercury.

2. In a method of making a compound having the general formula:

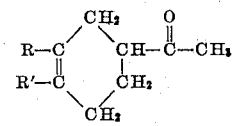

wherein R and R' each represents hydrogen or a lower alkyl radical, the step which consists in reacting vinyl acetylene with water and a conjugated aliphatic diolefine in the presence of an at least sparingly soluble salt of mercury.

3. In a method of making a compound having the general formula:

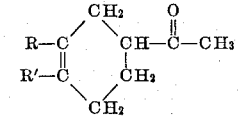

wherein R and R' represents hydrogen or a lower alkyl radical, the step which consists in reacting vinyl acetylene with water and a conjugated aliphatic diolefine in the presence of an acidic aqueous solution of a salt of mercury.

4. In a method of making a compound having the general formula:

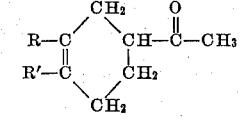

wherein R and R' each represents hydrogen or a lower alkyl radical, the step of reacting vinyl acetylene with water and a conjugated aliphatic diolefine in the presence of an aqueous solution of a mercuric salt.

5. In a method of making a compound having the general formula:

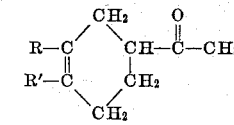

wherein R and R' each represents hydrogen or a lower alkyl radical, the step of reacting vinyl acetylene with water and a conjugated aliphatic diolefine in the presence of an acidic aqueous solution of a mercuric salt and an oxidizing agent.

6. In a method of making a compound having the general formula:

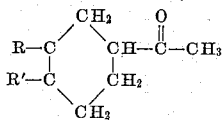

wherein R and R' each represents hydrogen or a lower alkyl radical, the step which consists in reacting vinyl acetylene with water and a conjugated aliphatic diolefine in the presence of an aqueous solution of a mercuric salt and a ferric salt.

7. In a method of making a compound having the general formula:

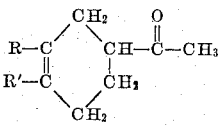

wherein R and R' each represents hydrogen or a lower alkyl radical, the step which consists in heating a hydrocarbon mixture comprising a conjugated aliphatic diolefine and vinyl acetylene together with an aqueous solution of a salt of mercury to a reaction temperature between 40° and 80° C.

8. In a method of making a compound having the general formula:

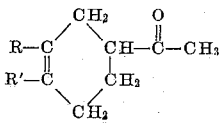

wherein R and R' each represents hydrogen or a lower alkyl radical, the step which consists in heating a hydrocarbon mixture comprising a conjugated aliphatic diolefine and vinyl acetylene together with an aqueous solution of a mercuric salt and an oxidizing agent to a reaction temperature between 40° and 80° C. at superatmospheric pressure.

9. In a method of making a compound having the general formula:

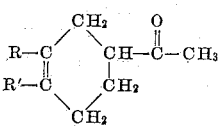

wherein R and R' each represents hydrogen or a lower alkyl radical, the step which consists in heating a hydrocarbon mixture comprising a conjugated aliphatic diolefine and vinyl acetylene together with an aqueous solution of a mercuric salt and a ferric salt to a reaction temperature between 40° and 80° C. at superatmospheric pressure.

10. In a method of making a compound having the general formula:

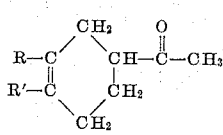

wherein R and R' each represents hydrogen or a lower alkyl radical, the step which consists in heating a hydrocarbon mixture comprising a conjugated aliphatic diolefine and vinyl acetylene together with an acidic aqueous solution of mercuric sulphate and ferric sulphate to a reaction temperature between 40° and 80° C. at superatmospheric pressure.

11. The method which comprises heating a fraction of cracked-oil gas which comprises a conjugated aliphatic diolefine and vinyl acetylene together with an aqueous solution of a salt of mercury to a reaction temperature above 40° C., but below that at which the diolefine is decomposed, and thereafter separating from the reacted mixture an acetyl-cycloalkene having the general formula:

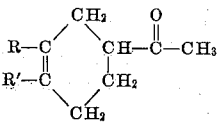

wherein R and R' each represents hydrogen or a lower alkyl radical.

12. The method which comprises heating a hydrocarbon mixture containing a conjugated aliphatic diolefine and vinyl acetylene together with an acidic aqueous solution of a mercuric salt and a ferric salt to a reaction temperature between 40° and 100° C. at superatmospheric pressure and thereafter separating from the reacted mixture an acetyl-cycloalkene having the general formula:

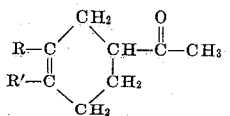

wherein R and R' each represents hydrogen or a lower alkyl radical.

13. The method which comprises heating at superatmospheric pressure a fraction of cracked-oil gas which contains a conjugated aliphatic diolefine and a relatively small proportion of vinyl acetylene together with an acidic aqueous solution of mercuric sulphate and ferric sulphate to a temperature between about 40° and about 80° C., separating the organic layer of the reacted mixture, distilling the organic layer to obtain a fraction consisting of a mixture of unreacted hydrocarbons relatively free of hydrocarbons of the acetylene series and another fraction consisting substantially of an acetyl-cycloalkene having the general formula:

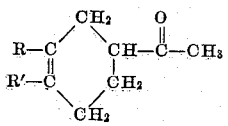

wherein R and R' each represents hydrogen or a lower alkyl radical, and treating the fraction of unreacted hydrocarbons with an aqueous solution of an alkali metal acid-sulphite to remove any aldehydes and ketones contained therein.

14. The method which comprises heating a hydrocarbon mixture containing butadiene-1,3 and vinyl acetylene together with an aqueous solution of a salt of mercury to a reaction temperature above 40° C., but below the temperature at which the butadiene is decomposed, whereby 1,2,3,6-tetrahydroacetophenone is formed.

15. The method which comprises heating a hydrocarbon mixture containing isoprene and vinyl acetylene together with an aqueous solution of a salt of mercury to a reaction temperature above 40° C., but below the temperature at which isoprene is decomposed, whereby methyl-1,2,3,6-tetrahydroacetophenone is formed.

EDGAR C. BRITTON.
HOWARD S. NUTTING.
LEE H. HORSLEY.